A. Z. SNYDER.
BUCKET HANDLE.
APPLICATION FILED OCT. 13, 1916.
1,226,403. Patented May 15, 1917.
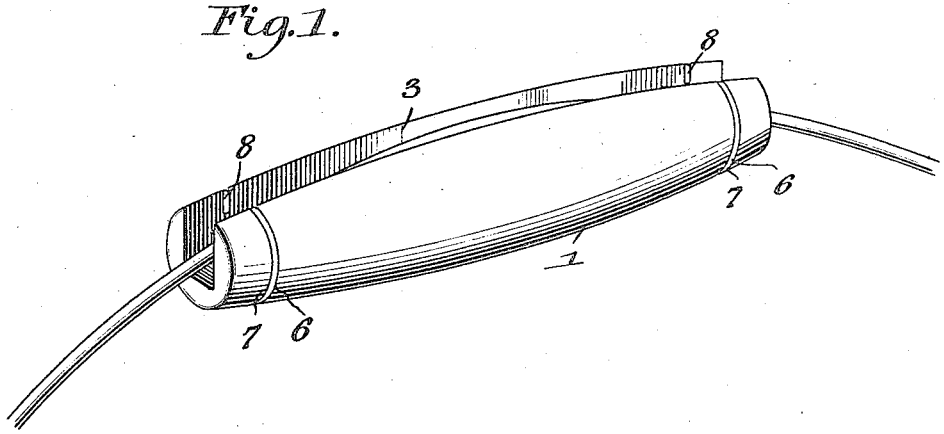
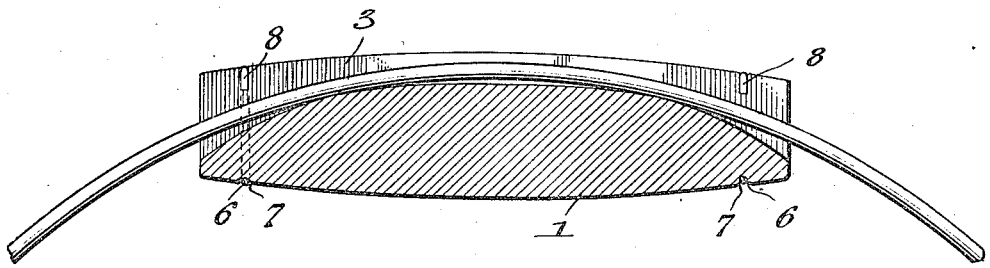
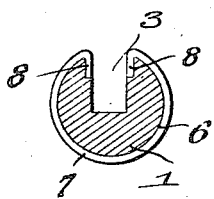 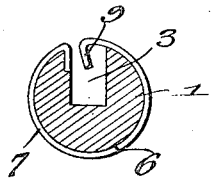
Inventor
A. Z. Snyder.
By Victor J. Evans
Attorney
Witnesses
Frederick Elg.

UNITED STATES PATENT OFFICE.

AUGUST Z. SNYDER, OF TURTLE CREEK, PENNSYLVANIA.

BUCKET-HANDLE.

1,226,403.	Specification of Letters Patent.	Patented May 15, 1917.

Application filed October 13, 1916. Serial No. 125,434.

*To all whom it may concern:*

Be it known that I, AUGUST Z. SNYDER, a citizen of the United States, residing at Turtle Creek, in the county of Allegheny and State of Pennsylvania, have invented new and useful Improvements in Bucket-Handles, of which the following is a specification.

This invention relates to handles or grips, especially adapted for use in connection with the bail of a bucket or other receptacle.

An object of the invention is to provide a handle or grip which may be used in connection with a bucket or other receptacle provided with a wire bail.

Another object of the invention is to provide a device of this class which is of a convenient form to fit the hand, and which may be readily attached or detached to the bail of a bucket or other receptacle.

With the above objects in view the invention consists of the following novel combination and arrangement of parts hereinafter more fully described and illustrated in the accompanying drawings, in which:

Figure 1 is a perspective view of the handle or grip applied to the bail of a bucket;

Fig. 2 is a longitudinal sectional view of the same;

Fig. 3 is a transverse sectional view through the groove at one end of the handle illustrating the binding elements; and Fig. 4 is a similar view showing how the binding element may be made temporarily from the handle in position upon the bail.

Referring to the drawings in detail similar characters of reference denote corresponding parts. The handle 1 in the present instance, is shown as applied to a wire bail of a bucket, and comprises a substantially cylindrical member preferably formed of wood, or it is obvious that a composition may be employed. Extending longitudinally of the handle is a groove 3, whose depth at the center is equal to about one-fourth the diameter of the handle, and extends downward and outwardly toward the ends to form a curve to fit the rounded portion of the bail.

In order to prevent the handle from splitting due to the longitudinal groove, there is provided at each end a binding element 6 in the form of a wire extending transversely around the handle at each end, and seated within a groove 7, in order to provide a flush surface. The ends of the wire are bent downwardly within the longitudinal groove as shown at 8 to securely hold the said wire in position.

In the modification shown the binding element is extended slightly beyond the wall of the longitudinal groove to provide a spring end 9 to temporarily hold the handle in position upon the bail.

Various changes in the form and proportion of the invention may be made as properly fall within the scope of the appended claims, and the right is reserved to make such changes.

Having described the invention, what is claimed is:

1. A detachable handle comprising a substantially cylindrical member having a longitudinal slot therein, and a permanently attached binding wire seated in grooves at each end of said member, said wire having its free ends turned downwardly into the longitudinal slot.

2. A detachable handle comprising a substantially cylindrical member having a longitudinal slot therein, binding wires partially surrounding said handle and spring retaining ends formed on said wires and extending within said slot.

In testimony whereof I affix my signature.

AUGUST Z. SNYDER.